United States Patent [19]

Huckestein et al.

[11] Patent Number: 5,698,647
[45] Date of Patent: Dec. 16, 1997

[54] PREPARATION OF POLYMERS BASED ON BASIC VINYL MONOMERS

[75] Inventors: Brigitta Huckestein, Schifferstadt; Volker Schehlmann, Römerberg; Axel Sanner, Frankenthal; Rainer Blankenburg, Ludwigshafen, all of Germany

[73] Assignee: BASF Aktiengesellschaft, Ludwigshafen, Germany

[21] Appl. No.: 697,724

[22] Filed: Aug. 29, 1996

[30] Foreign Application Priority Data

Sep. 8, 1996 [DE] Germany .............. 195 33 217.2

[51] Int. Cl.$^6$ ................................ C08F 2/16
[52] U.S. Cl. ............................ 526/219.5; 526/264
[58] Field of Search ........................... 526/219.5

[56] References Cited

U.S. PATENT DOCUMENTS

| | | | |
|---|---|---|---|
| 2,643,990 | 6/1953 | Ham | 526/219.5 |
| 2,927,102 | 3/1960 | Wolfgang et al. | 526/219.5 |
| 3,006,900 | 10/1961 | Fikentscher et al. | 526/219.5 |
| 4,701,494 | 10/1987 | Graafland | 526/219.5 |

FOREIGN PATENT DOCUMENTS

| | | | |
|---|---|---|---|
| 559630 | 1/1980 | Japan | 526/219.5 |
| 188006 | 10/1966 | U.S.S.R. | 526/219.5 |
| WO93/16114 | 8/1993 | WIPO . | |

OTHER PUBLICATIONS

Derwent Publ, Abst. JP 57 092 422.
Chem. Abst., vol. 87, No. 22, 1977, Abs. No. 168624b (English abstract of JP 52 071 586).

Primary Examiner—Joseph L. Schofer
Assistant Examiner—N. Sarofim
Attorney, Agent, or Firm—Keil & Weinkauf

[57] ABSTRACT

A process for the preparation of low-hydrazine polymers based on basic vinyl monomers by free-radical solution polymerization in aqueous medium in the presence, as compound which forms free radicals, of an azo compound which has alkoxycarbonyl groups on the carbon atoms adjacent to the azo group.

2 Claims, No Drawings

PREPARATION OF POLYMERS BASED ON BASIC VINYL MONOMERS

The present invention relates to a process for the preparation of polymers based on vinyl monomers with a basic reaction by solution polymerization initiated by free radicals in aqueous medium in the presence, as compound forming free radicals, of an azo compound which has alkoxycarbonyl groups on the carbon atoms adjacent to the azo group.

The preparation of polymers based on basic vinyl monomers such as heterocyclic N-vinyl compounds or acrylamide by free-radical solution polymerization in aqueous medium in the presence of azo initiators is known. For this purpose, the azo initiator is added to solutions of the monomers, and polymerization takes place at elevated temperature.

Particularly with a view to the use of such polymers in cosmetic or pharmaceutical compositions it is necessary that such polymers have a minimum content of toxicologically objectionable impurities.

The azo initiator which is most commonly used, because of its favorable kinetics of decomposition, in free-radical polymerizations is azobisisobutyronitrile. However, this initiator is now regarded as objectionable because of the toxic properties of its decomposition products. This is because the main decomposition product is tetramethylsuccinonitrile which is categorized as very toxic on the basis of its $LD_{50}$ values (rat, oral: 23–30 mg/kg).

Suitable substitutes for azobisisobutyronitrile are azobis carboxylic esters, for example dimethyl 2,2'-azobisisobutyrate, because these have similarly favorable kinetics of decomposition and the main decomposition products which occur are dialkyl isobutyrates which are not a health hazard.

However, it has emerged that, when such free-radical initiators are used in the polymerization of basic vinyl monomers under conventional conditions in aqueous medium, hydrazine has been found in the finished polymers in amounts which cannot be tolerated on use of the polymers in cosmetics and drugs.

It is an object of the present invention to find a process for the preparation of such polymers which permits dialkyl 2,2'-azobisisobutyrates to be used as free-radical formers without the hydrazine contents of the finished polymers being too high.

We have found that this object is achieved by a process for the preparation of polymers based on vinyl monomers with a basic reaction by solution polymerization initiated by free radicals in aqueous medium in the presence, as compound forming free radicals, of an azo compound which has alkoxycarbonyl groups on the carbon atoms adjacent to the azo group, wherein before the addition of the compound forming free radicals the monomer solution is adjusted to a pH in the range from 3 to 8 by adding acid, and then the polymerization is carried out.

The process according to the invention is particularly suitable for the preparation of homo- or copolymers of heterocyclic N-vinyl monomers and/or of acrylamide.

Suitable heterocyclic N-vinyl monomers are N-vinylpyrrolidone (VP), N-vinylcaprolactam (VCap) and/or N-vinylimidazole (VI). Accordingly, besides the homopolymers, it is possible to prepare according to the invention VP/VCap, VP/VI or VI/VCap copolymer or else the corresponding terpolymers with any desired ratios of amounts of the relevant monomers. It is furthermore possible to prepare by the process according to the invention not only the homopolymer of acrylamide but also copolymers of said N-vinyl monomers and acrylamide. In addition, the polymers may also contain other vinyl monomers which can undergo free-radical copolymerization, for example vinyl acetate, $C_1$–$C_{10}$-alkyl(meth)acrylates or N-alkylacrylamides, it being possible for the amounts of such comonomers to be up to 10% by weight based on the amounts of the monomers used.

To carry out the process according to the invention, firstly a solution of the monomers is prepared. Water is suitable and preferred as solvent, but it is also possible to use water/alcohol mixtures with alcohol contents of up to 30% by weight, in which case suitable and preferred alcohols are ethanol or isopropanol. Because of the basicity of the monomers, the monomer solutions normally have a pH above 8. The pH is then adjusted, by adding acid, to the range from 5 to 7, with the neutral range being preferred. Which pH is set depends in particular on the nature of the monomers used. In the case of acid-sensitive monomers such as N-vinylpyrrolidone or N-vinylcaprolactam, it is advisable to operate in the neutral range, while lower pH values can also be set in the case of more acid-stable monomers.

Suitable as acids according to the invention are lower carboxylic acids with from 1 to 4 carbon atoms, such as formic acid, acetic acid, oxalic acid or lactic acid, with formic acid being preferred, and, furthermore, inorganic acids such as sulfuric acid, phosphoric acid, phosphorous acid or hydrochloric acid.

The compounds which form free radicals are then added to the monomer solutions prepared in this way.

Suitable substances forming free radicals according to the invention are azo initiators which have esterified carboxyl groups on carbon atoms adjacent to the azo group and can be described by the general formula I

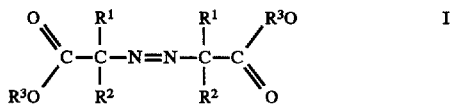

where $R^1$ and $R^2$ can be identical or different and are hydrogen or $C_1$–$C_4$-alkyl, and $R^3$ is a linear or branched $C_1$–$C_8$-alkyl radical, preferably a $C_1$–$C_4$-alkyl radical.

Preferred azo initiators according to the invention are $C_1$–$C_4$-dialkyl 2,2'-azobisisobutyrates, and dimethyl 2,2'-azobisisobutyrate is particularly preferred.

The amount of azo initiator used is normally 0.005–10% by weight, preferably 0.01–5% by weight, based on the amount of monomers used.

The polymerization is normally carried out at from 60° to 130°, preferably 70° to 90° C. The azo initiator can be added before the monomer solution is heated to the required polymerization temperature or, preferably, after the heating of the monomer solution. The azo initiator can also be added in portions to the monomer solution.

In addition, it is also possible to add regulators to control the molecular weight such as mercaptoethanol or isopropanol, to the polymerization mixture.

It may be advisable after the polymerization to carry out in a conventional way a subsequent polymerization to reduce the residual monomer content. It is possible for this purpose, for example, to carry out a subsequent treatment at a temperature above the polymerization temperature in the presence of a peroxide initiator. A subsequent treatment in acidic medium as described in WO 93/16114 is also suitable for reducing the residual monomer content.

The aqueous or aqueous/alcoholic solutions can, if required, be converted by conventional processes into powders, for example by spray-drying, fluidized bed drying, drum drying or belt drying.

The K values of the polymers are normally in the range from 50 to 120. The K values are determined at 25° C. on a 1% by weight aqueous solution. The determination is described in H. Fikentscher, Systematik der Cellulosen aufgrund ihrer Viskosität, Cellulose-Chemie 13 (1932), 58–64 and 71–74.

The process according to the invention makes it possible to prepare in a simple manner low-hydrazine polymers based on basic vinyl monomers.

The polymers have hydrazine contents <1 ppm and are thus suitable for use in pharmaceutical or cosmetic preparations.

In the following examples, the hydrazine content of the polymers was determined as specified in the German Pharmacopeia:

The test is by thin-layer chromatography (V.6.20.2) using a layer of silanized silica gel HR.

The solutions are prepared immediately before use.

Test solution: 2.5 g of substance are dissolved in 25 ml of water. 0.5 ml of a 5 percent solution (m/V) of salicylaldehyde R in methanol R is added and the mixture is heated in a waterbath at 60° C. for 15 min. The mixture is allowed to cool and extracted by shaking with 2.0 ml of toluene R for 2 min. The clear upper layer after centrifugation is used.

Reference solution: 9 mg of salicylaldazine R are dissolved and made up to 100 ml in toluene R. 1 ml of solution is diluted to 10 ml with toluene R.

10 µl of each solution are loaded separately onto the plate. The chromatography is carried out with a mixture of 30 parts by volume of water and 70 parts by volume of methanol R over a migration distance of 15 cm. The plate is left to dry in air and evaluated under ultraviolet light at 365 nm. There must be no spot corresponding to salicylaldazine in the chromatogram of the test solution which is larger or more intense than the spot in the chromatogram of the reference solution (1 ppm hydrazine).

EXAMPLE 1

20 g of N-vinylpyrrolidone were mixed with 80 g of water and heated to 70° C., the pH of this mixture being 9. The pH was adjusted to 7 by adding formic acid, and then 0.015 g of dimethyl 2,2'-azobisisobutyrate was added. The reaction mixture was kept at 70° C. for two hours and then a further 0.03 g of the azo initiator was added and, after polymerization at 80° C. for a further two hours, the resulting polymer was dried. The hydrazine content of the dry powder was less than 1 ppm, and the K value was 99.

EXAMPLE 2

The polymerization took place as in Example 1. After the polymerization was complete, the aqueous polymer was adjusted to pH 4 with formic acid and heated at 95° C. for two hours. The hydrazine content of the dry powder was less than 1 ppm, and the K value was 99.

EXAMPLE 3

A mixture of 15 g of N-vinylpyrrolidone, 5 g of vinylcaprolactam and 80 g of water was heated to 80° C., adjusted to pH 7 with acetic acid, 0.015 g of dimethyl 2,2'-azobisisobutyrate was added and the mixture was kept at 80° C. for two hours. Then a further 0.03 g of the azo initiator was added and the mixture was heated at 80° C. for two hours. The dried polymer had a hydrazine content of <1 ppm and a K value of 86.

EXAMPLE 4

The preparation took place as in Example 1 but dibutyl 2,2'-azobisisobutyrate was used as azo initiator. The initiator was prepared as described by S. Bizilj et al., Aust. J. Chem., 38, (1985) 1657–73. The hydrazine content of the 20% by weight aqueous polymer solution was 1 ppm. The K value of the polymer was 86.

EXAMPLE 5

A mixture of 40 g of acrylamide and 60 g of water, whose pH was 9.0, was heated to 70° C. and adjusted to pH 7.0 by adding formic acid, and 0.015 g of dimethyl 2,2'-azobisisobutyrate was added. The polymerization solution was kept at 70° C. for two hours, then a further 0.03 g of the azo initiator was added and the mixture was heated at 80° C. for two hours. The hydrazine content of the 20% by weight solution of the polymer was <1 ppm.

EXAMPLE 6

A solution of 19 g of N-vinylpyrrolidone and 1 g of acrylamide in 80 g of water was heated to 70° C. and adjusted to pH 7.0 by adding formic acid, and then 0.015 g of dimethyl 2,2'-azobisisobutyrate was added. The polymerization solution was kept at 70° C. for two hours, then a further 0.03 g of the azo initiator was added and the mixture was heated at 80° C. for two hours. The hydrazine content of the dried powder was <1 ppm. The K value of the polymer was 97.

Comparative Example 1

A mixture of 20 g of N-vinylpyrrolidone, 80 g of water and 0.015 g of dimethyl 2,2'-azobisisobutyrate was heated to 70° C. and kept at this temperature for two hours. A further 0.03 g of the azo initiator was then added and the polymerization mixture was kept at 80° C. for a further two hours. After cooling, the aqueous polymer was dried in a drum drier. The hydrazine content of the dried powder was 1.5 ppm, and the K value was 97.

Comparative Example 2

The polymerization took place as in Comparative Example 1. Subsequently the pH of the aqueous polymer was reduced to pH 4 with formic acid and it was then heated at 95° C. for two hours. The hydrazine content of the dried powder was 10 ppm, and the K value was 96.

Comparative Example 3

The preparation took place as in Example 5 but without reducing the pH before the polymerization started. The hydrazine content of the polymerization solution obtained in this way was 1.8 ppm, and the K value of the polymer was 20.5.

We claim:

1. A process for the preparation of polymers based on vinyl monomers with a basic reaction by solution polymerization initiated by free radicals in aqueous medium in the presence, as compound forming free radicals, of an azo compound which has alkoxycarbonyl groups on the carbon atoms adjacent to the azo group, wherein before the addition of the compound forming free radicals the monomer solution is adjusted to a pH in the range from 3 to 8 by adding acid, and then the polymerization is carried out.

2. A process as claimed in claim 1, wherein dimethyl 2,2'-azobisisobutyrate is used as compound forming free radicals.

* * * * *

UNITED STATES PATENT AND TRADEMARK OFFICE
CERTIFICATE OF CORRECTION

PATENT NO.: 5,698,647

DATED: December 16, 1997

INVENTOR(S): HUCKESTEIN et al.

It is certified that error appears in the above-identified patent and that said Letters Patent is hereby corrected as shown below:

On the cover page, item [30], the foreign application priority date "Sep. 8, 1996" should be -- Sep. 8, 1995--.

Signed and Sealed this

Tenth Day of March, 1998

Attest:

BRUCE LEHMAN

*Attesting Officer*  *Commissioner of Patents and Trademarks*